United States Patent Office 2,806,324
Patented Sept. 17, 1957

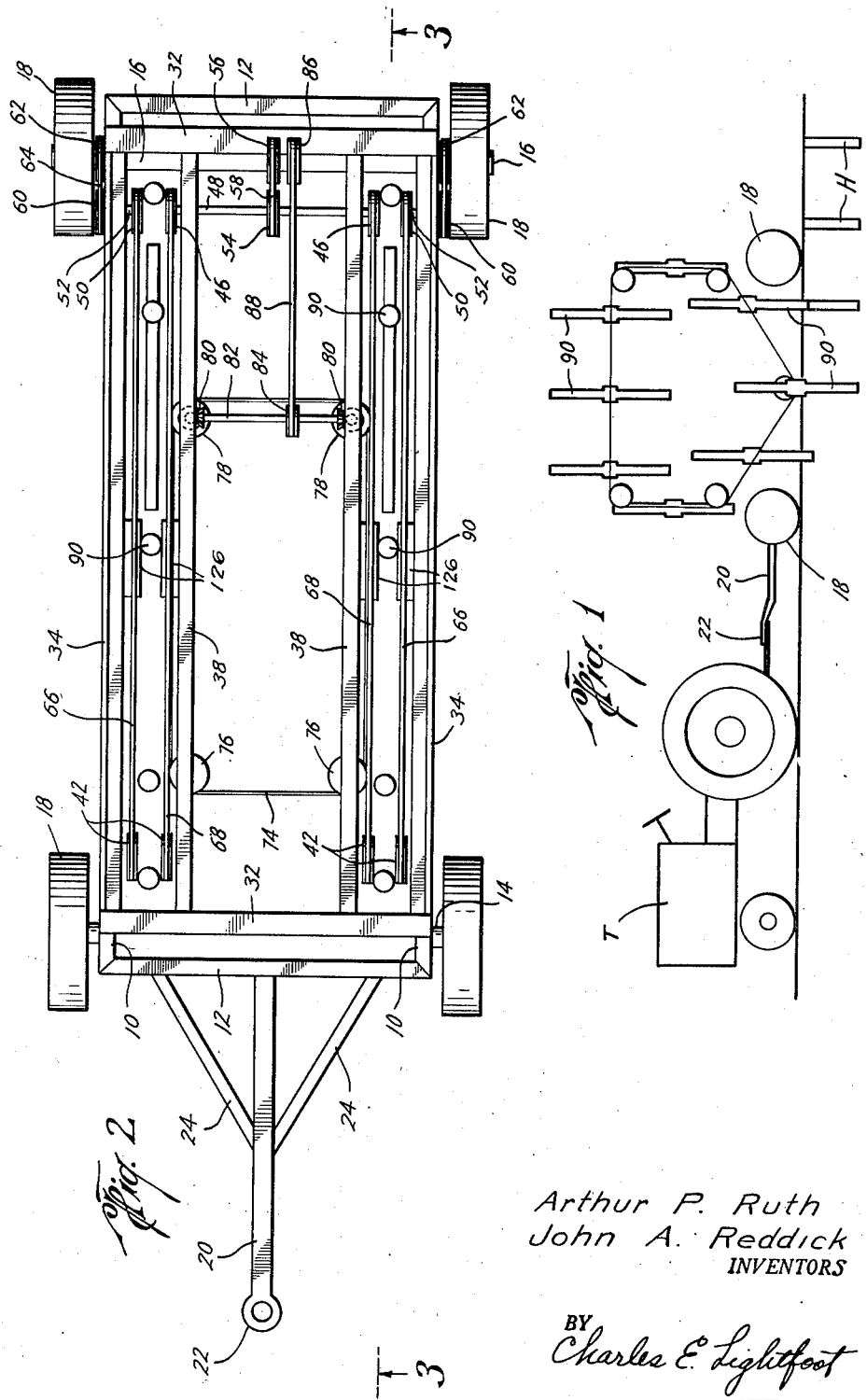

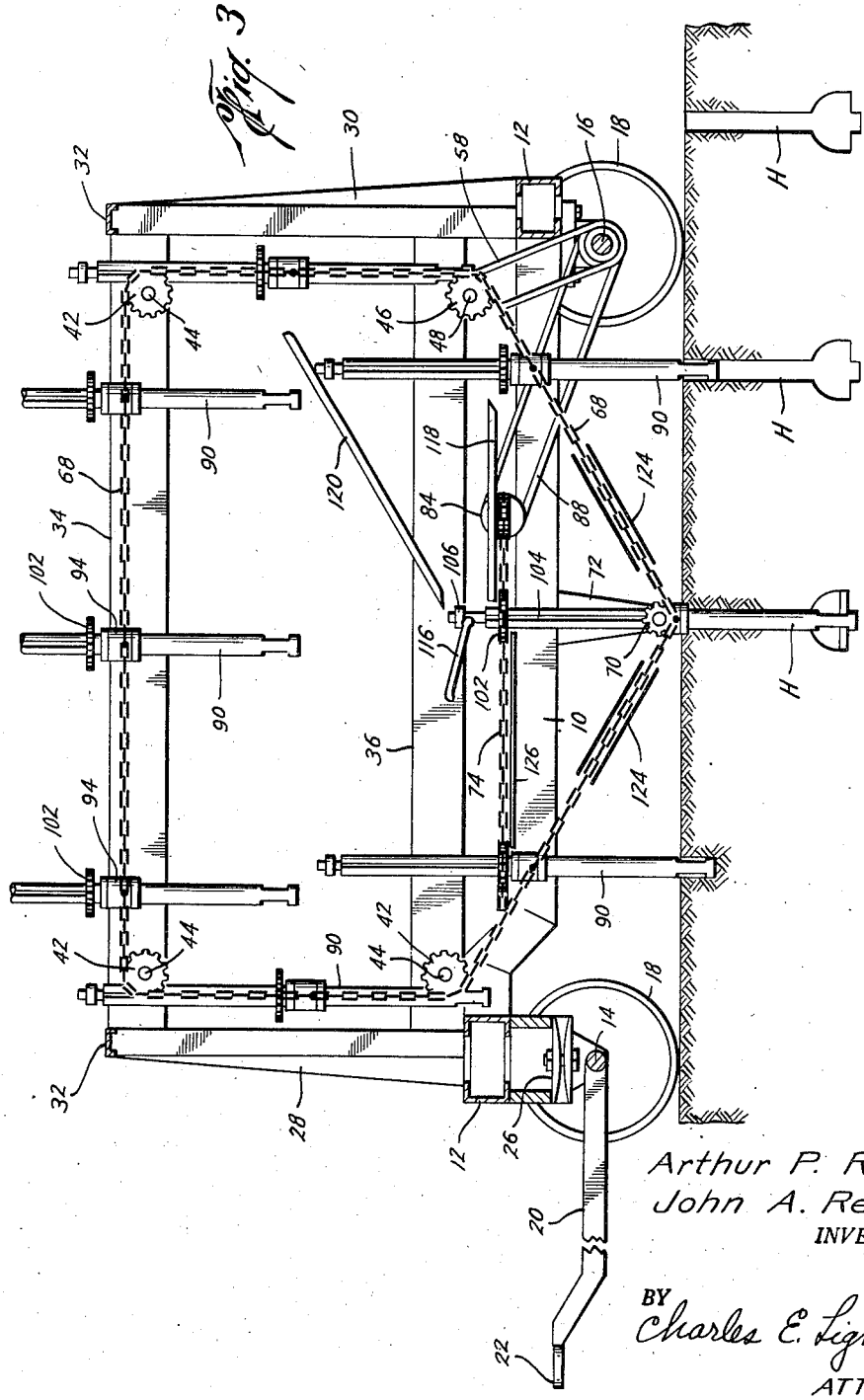

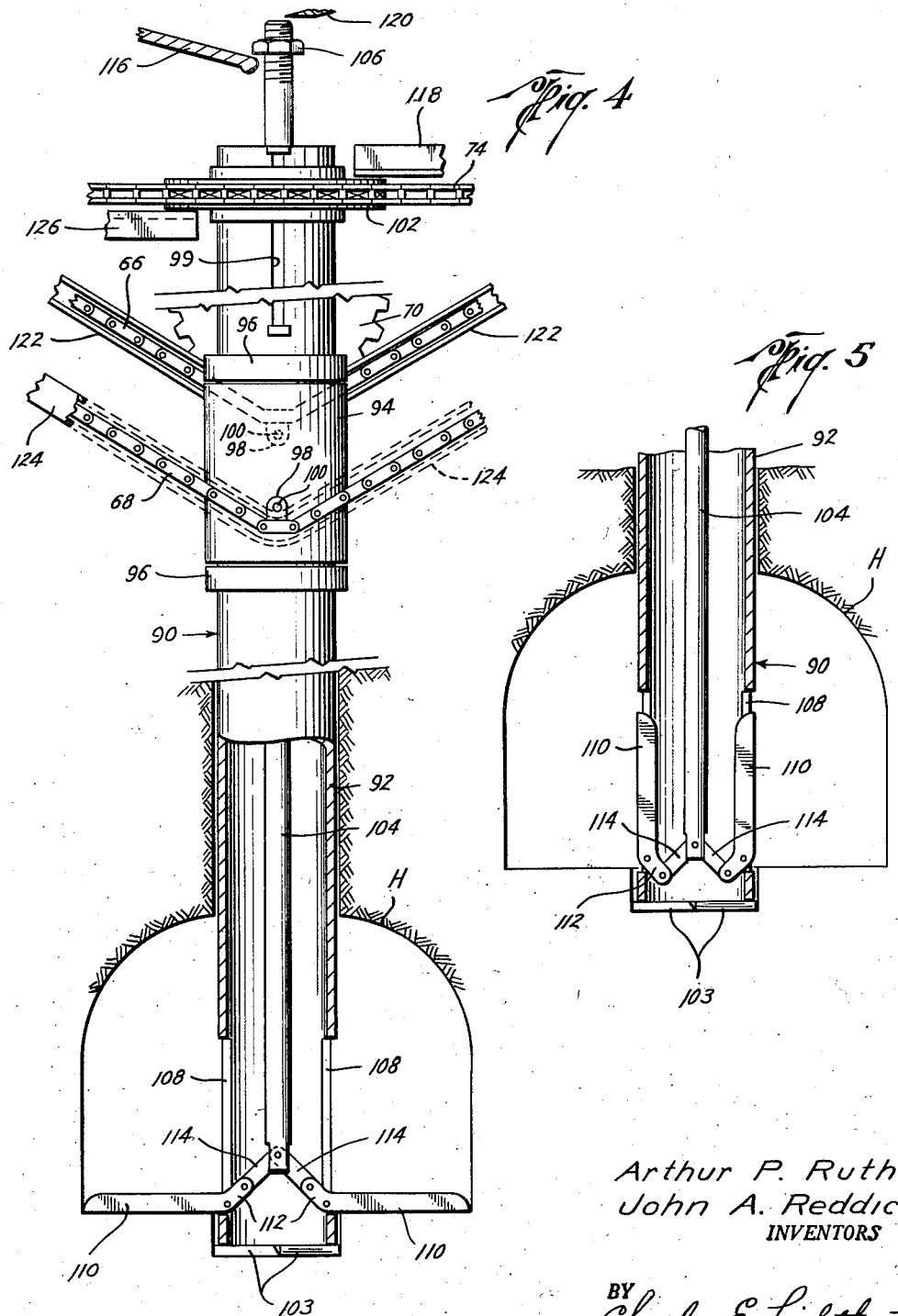

2,806,324

MEANS FOR IMPROVING THE WATER RECEIVING AND RETAINING CHARACTERISTICS OF LAND

Arthur P. Ruth and John A. Reddick, Houston, Tex.

Application November 20, 1953, Serial No. 393,314

4 Claims. (Cl. 47—1)

This invention relates to a means for improving the water receiving and retaining characteristics of land, and more particularly to a means for increasing the retention and distribution of water in the soil.

The problem of providing adequate soil moisture in agriculture is one of long standing and has been found particularly difficult in regions where the rain fall is low and where the soil is of a character which does not readily absorb water. In some localities the annual rain fall would provide sufficient water for agricultural purposes, if it were possible to retain the water in the soil, but because of the infrequent heavy precipitation and long intervening periods of no rain fall, as well as the relatively impenetrable character of the soil, the water rapidly runs off and is not sufficiently retained to provide the soil moisture required for continued growth of crops during periods of dry weather.

Moreover, in locations where irrigation is available it is often necessary to provide means for preventing the water from draining off of the surface, in order to assure sufficient penetration of the soil to furnish adequate soil moisture. The flooding of the surface of the land also results in a high rate of evaporation whereby much of the water which might in time be absorbed by the soil is lost.

It is an important object of the present invention to provide a method of and means for preparing land to receive and retain water in a manner to permit its gradual absorption by the soil and to reduce the loss of water by surface evaporation.

Another object of the invention is the provision of a method of and means for preparing land to substantially reduce the loss of water by surface drainage and to retain the water in the soil for gradual absorption thereby.

A further object of the invention is to provide a method of and means for preparing land to increase the depth to which water may penetrate the soil and to improve the uniformity of the distribution of water throughout the soil.

Another object of the invention is the provision of a method of and means for preparing land by forming therein numerous spaced apart holes or storage wells of suitable depth to serve as reservoirs for the storage of water to retain the same in the soil whereby improved distribution and absorption is obtained.

A further object of the invention is to provide apparatus for forming holes in land and which operates automatically as it is moved over the ground to bore numerous holes of uniform depth and spacing and which have enlarged portions at their lower ends to receive and distribute water throughout the soil.

The above and other important objects of the invention will best be understood from the following detailed description constituting a specification of the same when considered in conjunction with the annexed drawings, wherein—

Figure 1 is a side elevational view on a somewhat reduced scale, illustrating the invention somewhat diagrammatically and showing the manner in which the method is carried out;

Figure 2 is a top plan view of the invention;

Figure 3 is a cross sectional view taken along the line 3—3 of Figure 2, looking in the direction indicated by the arrows;

Figure 4 is a fragmentary side elevational view, partly broken away and partly in cross-section, on a somewhat enlarged scale, showing the construction and operation of one of the hole drilling units with the hole enlarging mechanism in expanded condition; and Figure 5 is a view similar to that of Figure 4 showing the hole enlarging mechanism in retracted condition.

Referring now to the drawings in greater detail, the invention includes a vehicle having an underframe of suitable construction having side and end frame members 10 and 12, respectively, and which is mounted on conventional axles 14 and 16 supported on wheels 18. At its front end the underframe may be provided with suitable means such as the tongue 20 connected to the front axle 14, and having at its free end an eye 22 by which the vehicle may be connected to a tractor T, or other suitable towing implement. The tongue 20 may also be connected mediate its ends with spaced points on the axle 14, by diagonal braces 24. As seen in Figure 3 the front axle 14 has a pivoted connection, indicated at 26, with the front end of the underframe, whereby the vehicle will be guided to follow the movements of the tractor T.

The underframe carries uprights 28 and 30 at its opposite ends, whose upper ends are connected together by cross members 32 and by longitudinal side members 34. The uprights are also connected at points above the underframe by longitudinal side members 36, as best seen in Figure 3.

Longitudinal braces 38 are also provided, spaced inwardly of the side members 34 and 36 and parallel thereto.

Between the upper and lower longitudinal side members 34 and 36 and their respective inwardly spaced longitudinal braces 38 sprocket and chain mechanism is located by which earth boring units are carried and operated to form spaced holes in the land as the vehicle is moved thereover. The sprocket and chain mechanism includes pairs of idler sprockets 42, 42 rotatably mounted on shafts 44 carried in suitable bearings on the members 34 and 36 and the corresponding braces 38, and the driving sprockets 46 mounted on drive shaft 48 and driving sprockets 50 mounted on drive shafts 52. The drive shaft 48 is driven from the rear axle 16 by means of the sprocket 54 on the shaft 48 and the sprocket 56 on the rear axle, over which a drive chain 58 passes. Drive shafts 52 are similarly operated from the rear axle by the sprockets 60 on the drive shafts and the sprockets 62 on the axle about which chains 64 pass.

Sprocket chains 66 and 68 pass over and are actuated by the above described sprocket mechanism these chains also passing about idler sprockets 70 carried on suitable brackets, such as that indicated at 72, extending downwardly from the underframe.

A drill rotating chain 74 is also provided which extends horizontally about sprockets 76 and 78 carried on vertical bearings mounted on the lower braces 38, the sprockets 78 being driven by gear mechanism indicated at 80 actuated by a drive shaft 82 which is operated from the rear axle 16 through sprockets 84 and 86 over which a drive chain 88 passes.

The above described sprocket and chain mechanism constitutes the means by which earth boring units generally indicated at 90, and illustrated in detail in Figures 4 and 5 are successively moved to positions to form holes in the ground and operated to drill such holes at spaced intervals as the vehicle is drawn over the land.

Each of the earth boring units 90 preferably includes a tubular casing 92 mounted for vertical rotation in a vertically disposed bearing sleeve 94, the casing having spaced external collars 96 thereon to retain the casing in the sleeve. The bearing sleeve is pivotably secured to the sprocket chains 66 and 68 by means of links 98 which are pivotally connected by pins 100 to the sleeve. As best seen in Figure 4 the chains 66 and 68 may be offset vertically from each other, and for this purpose the respective sprocket mechanisms over which the chains operate may also be vertically offset, to maintain the casings 92 in vertical positions and restrain the same from swinging in a vertical plane.

Adjacent its upper end, each casing has an external horizontally disposed sprocket 102 slidable vertically thereon, and positioned to engage the chain 74. The casing may have keyways, such as that indicated at 99 and the sprocket 102 is provided with keys, not shown, extending into the keyways, whereby the casing rotates with the sprocket but may have limited vertical movement relative thereto. The casing 92 is open at its ends and is provided at its lower end with suitable cutters 103 which penetrate the soil as the casing rotates, the soil thus removed moving upwardly through the casing and being discharged from its upper end.

Extending vertically in the casing and projecting above its upper end there is a vertically movable shaft 104, which carries at its upper end an external enlargement or nut 106 for a purpose later to be made apparent.

The casing 92 is provided with window openings 108 near its lower end within which cutters 110 are pivotally mounted to swing to extended and retracted positions as shown in Figures 4 and 5, and these cutters have inwardly projecting lever arms 112 connected at their inner ends to links 114 which in turn are pivotally attached to the lower end of the shaft 104. It will be apparent that when the shaft 104 is in its lowermost position in the casing, as seen in Figure 5, the cutters 110 will be retracted within the window openings 108, and as the shaft is moved upwardly relative to the casing the cutters will swing outwardly toward their extended positions as seen in Figure 4.

Elongated stop or cam elements 116, one of which is shown in Figures 3 and 4, are attached to the longitudinal members 36 in position to engage the nuts 106 to limit the downward movement of the shaft 104 with the casing 92 during a part of the drilling movement of the casing so that the casing moves downwardly relative to the shaft during the time that the nut 106 is in contact with the cam, to cause the cutters 110 to be moved to their extended positions, as seen in Figure 4. Stop bars 118, one of which is illustrated in Figures 3 and 4, may also be attached in any convenient manner, to the vehicle in position to engage the sprockets 102 during the withdrawal movement of the casing after a hole has been drilled thereby to permit retraction of the cutters 110. Stop bars 120, one of which is shown in Figure 3, are similarly attached to the vehicle in any convenient manner in position to engage the upper end of the shaft 104 to limit upward movement of the shaft relative to the casing 92 during upward movement of the casing and shaft, to move the cutters 110 to their vertical, retracted positions in the casing and retain the cutters 110 retracted during withdrawal of the casing 92 from the hole.

Suitable guides 122 and 124 may be provided on the vehicle, which are rigidly secured thereto in any convenient manner and by the use of any convenient means, not shown, and in which guides the chains 66 and 68 run. Guides 126 and 128 may likewise be provided for the chain 74.

In making use of the apparatus, constructed as described above, the vehicle is attached to a tractor T, or other suitable towing implement, by the tongue 20, and is pulled along over the land which is to be prepared. As the vehicle moves forward the sprocket chains 66, 68 and 74 will be operated from the rear axle 16 through the mechanism described and the earth boring units 90 will be successively moved into positions to bore holes in the ground such as those indicated at H at suitably spaced intervals. Each unit remains in a substantially vertical position throughout its entire travel. As a unit moves to a position in which the lower end of the casing 92 engages the ground, the sprocket 102 thereof is moved to a position to engage the chain 74 and is engaged by the chain 74 as the unit moves horizontally, so that the casing begins to rotate as it is moved downwardly by the chains 66 and 68. The vehicle continues to move forward while the casing is rotating until the elongated cam 116 engages beneath the nut 106, whereupon downward movement of the shaft 104 with the casing is limited, to cause the casing to move downwardly relative to the shaft and upon further downward movement of the casing the cutters 110 are gradually moved to their extended positions, thus forming the enlarged cavity at the bottom of the bore hole. The earth removed by the end cutters 103 moves upwardly by displacement and is discharged from the upper end of the casing, and the earth removed by the cutters 110 enters the window openings 108 and is similarly discharged. After the enlarged cavity of the hole has been formed the cam 116 moves past the nut 106 and the stop bar 120 engages the upper end of the shaft 104 to limit upward movement of the shaft with the casing 92 to cause the cutters 110 to be moved to their retracted positions. The casing 92 is then withdrawn from the hole by the chains 66 and 68 while continuing to be rotated by the sprocket which is prevented from moving upwardly with the casing by the stop bar 118 until the casing is nearly completely withdrawn from the hole. Upon initial upward movement of the casing relative to the shaft 104, the cutters 110 move to their retracted positions within the window openings 108, as seen in Figure 5, and are retained in retracted positions by the stop bar 120 engaging the upper end of the shaft 104 during the withdrawal of the casing.

By the use of the apparatus in the manner described the vehicle may be rapidly moved over the land and numerous holes formed therein in uniformly spaced arrangement to receive and distribute water throughout the soil.

The method of the invention is carried out by the use of the above described or other suitable means whereby numerous storage reservoirs or wells are provided which may be formed with enlarged water receiving cavities to receive and distribute large amounts of water throughout the soil. By the use of this method large amounts of water may be entrapped and stored in the soil and gradually absorbed thereby without in any way interfering with the cultivation or other use of the land. The diameters of the holes may be relatively small at the surface of the ground while the enlarged cavities at the bottoms of the holes will provide relatively large reservoirs for the retention of large amounts of water beneath the surface which will remain in the reservoirs during cultivation or plowing of the soil.

It will thus be seen that the invention provides a method and means ideally adapted for use in regions of limited rainfall to entrap and store large amounts of water in the soil where it will be available to plants to promote continued growth during prolonged dry periods.

The invention has been disclosed herein in connection with certain specific apparatus and steps carried out, but it will be understood that these are intended by way of illustration only, and that numerous changes can be made therein without departing from the spirit of the invention, or the scope of the appended claims.

Having thus clearly shown and described the invention, what is claimed as new and desired to be secured by Letters Patent is—

1. A machine for preparing land to increase the water receiving and retaining characteristics of the land comprising a frame, wheels supporting the frame for movement over the land, an endless chain, means on the frame supporting the chain for movement in a vertical plane, means on the frame having a driving connection with the chain and operable to actuate the chain, earth boring means carried by the chain and movable therewith into and out of a position to penetrate the land and means on the frame positioned to engage the earth boring means when the earth boring means is in penetrating position to cause the earth boring means to rotate.

2. A machine for preparing land to increase the water receiving and retaining characteristics of the land comprising a frame, wheels supporting the frame for movement over the land, an endless chain, means on the frame supporting the chain for movement in a vertical plane, means on the frame having an operative connection with said chain and wheels to actuate the chain upon movement of the frame, earth boring means carried by the chain and movable therewith into and out of a position to penetrate the land and means on the frame positioned to engage the earth boring means when the earth boring means is in penetrating position to cause the earth boring means to rotate.

3. A machine for preparing land to increase the water receiving and retaining characteristics of the land comprising a frame, wheels supporting the frame for movement over the land, an endless chain, means on the frame supporting the chain for movement in a vertical plane, means on the frame having an operative connection with said chain and wheels to actuate the chain upon movement of the frame, earth boring means carried by the chain and movable therewith into and out of a position to penetrate the land, and means on the frame having an operative connection with the wheels and engageable with said earth boring means when in said position to rotate said earth boring means.

4. A machine for preparing land to increase the water receiving and retaining characteristics of the land comprising a frame, means supporting the frame for movement over the land, earth boring means movably carried by the frame and movable into and out of an earth penetrating position, said earth boring means including a tubular stem having lateral window openings, cutters mounted on the stem for swinging movement into and out of said openings, a rod movable longitudinally in said stem, means connecting said rod to said cutters and operable to move the cutters to positions extending outwardly of said openings upon longitudinal movement of the rod in one direction and to positions inwardly of said openings upon longitudinal movement of the rod in the other direction, means on the frame engageable with said stem to rotate the stem, and means on the frame engageable with said rod to move the rod longitudinally during rotation of the stem.

References Cited in the file of this patent

UNITED STATES PATENTS

| | | |
|---|---|---|
| 664,741 | Gibson | Dec. 25, 1900 |
| 1,298,509 | Johnson | Mar. 25, 1919 |
| 1,306,547 | Lyon | June 10, 1919 |
| 1,401,386 | Woodberry | Dec. 27, 1921 |
| 1,724,449 | Buddenbrock | Aug. 13, 1929 |
| 1,802,273 | Richards et al. | Apr. 21, 1931 |
| 1,955,631 | Harris | Apr. 17, 1934 |
| 2,067,781 | Mueller | Jan. 12, 1937 |
| 2,127,510 | Fulton | Aug. 23, 1938 |
| 2,172,574 | Campbell | Sept. 12, 1939 |
| 2,509,691 | McLemore | May 30, 1950 |
| 2,514,890 | McLemore | July 11, 1950 |
| 2,580,236 | Mascaro | Dec. 25, 1951 |
| 2,631,013 | Darin | Mar. 10, 1953 |
| 2,669,067 | Severance | Feb. 16, 1954 |
| 2,694,967 | Severance | Nov. 23, 1954 |

FOREIGN PATENTS

| | | |
|---|---|---|
| 2,501 | Great Britain | 1862 |
| 461,512 | Great Britain | Feb. 18, 1937 |